United States Patent [19]
Blenkush et al.

[11] Patent Number: 5,836,570
[45] Date of Patent: Nov. 17, 1998

[54] GATE VALVE SEAT

[75] Inventors: Robert Blenkush, St. Cloud; David Thomas, St. Joseph; Richard Reugemer, St. Cloud, all of Minn.

[73] Assignee: General Signal Corporation, Stamford, Conn.

[21] Appl. No.: 710,993

[22] Filed: Sep. 25, 1996

[51] Int. Cl.⁶ .................................................. F16K 3/03
[52] U.S. Cl. ........................................ 251/328; 251/172
[58] Field of Search ................... 251/172, 328; 137/860

[56] References Cited

U.S. PATENT DOCUMENTS

| | | | |
|---|---|---|---|
| 3,307,826 | 3/1967 | Lowrey | 251/328 X |
| 3,356,334 | 12/1967 | Scaramucci | 251/172 |
| 3,380,708 | 4/1968 | Scaramucci | 251/172 |
| 3,488,033 | 1/1970 | Priese | 251/172 |
| 3,580,541 | 5/1971 | Bouhot | 251/172 X |
| 3,834,664 | 9/1974 | Atkinson | 251/172 X |
| 3,945,604 | 3/1976 | Clarkson . | |
| 4,072,161 | 2/1978 | Schoeneweis et al. | 251/900 X |
| 4,163,544 | 8/1979 | Fowler et al. | 251/328 |
| 4,257,447 | 3/1981 | Clarkson . | |
| 4,334,550 | 6/1982 | Connor et al. | 251/328 X |
| 4,765,361 | 8/1988 | Clifford . | |
| 4,962,785 | 10/1990 | Clifford . | |

*Primary Examiner*—John Fox
*Attorney, Agent, or Firm*—Foley & Lardner

[57] ABSTRACT

There is provided a gate valve arrangement consisting of at least one sealing ring defining a valve seat, and having a reciprocable gate plate in sealing contact with the valve seat, which effects a pressure seal in one direction on the seat and at the same time allowing the seat to vent in the opposite direction to relieve pressure within the gate valve.

7 Claims, 7 Drawing Sheets

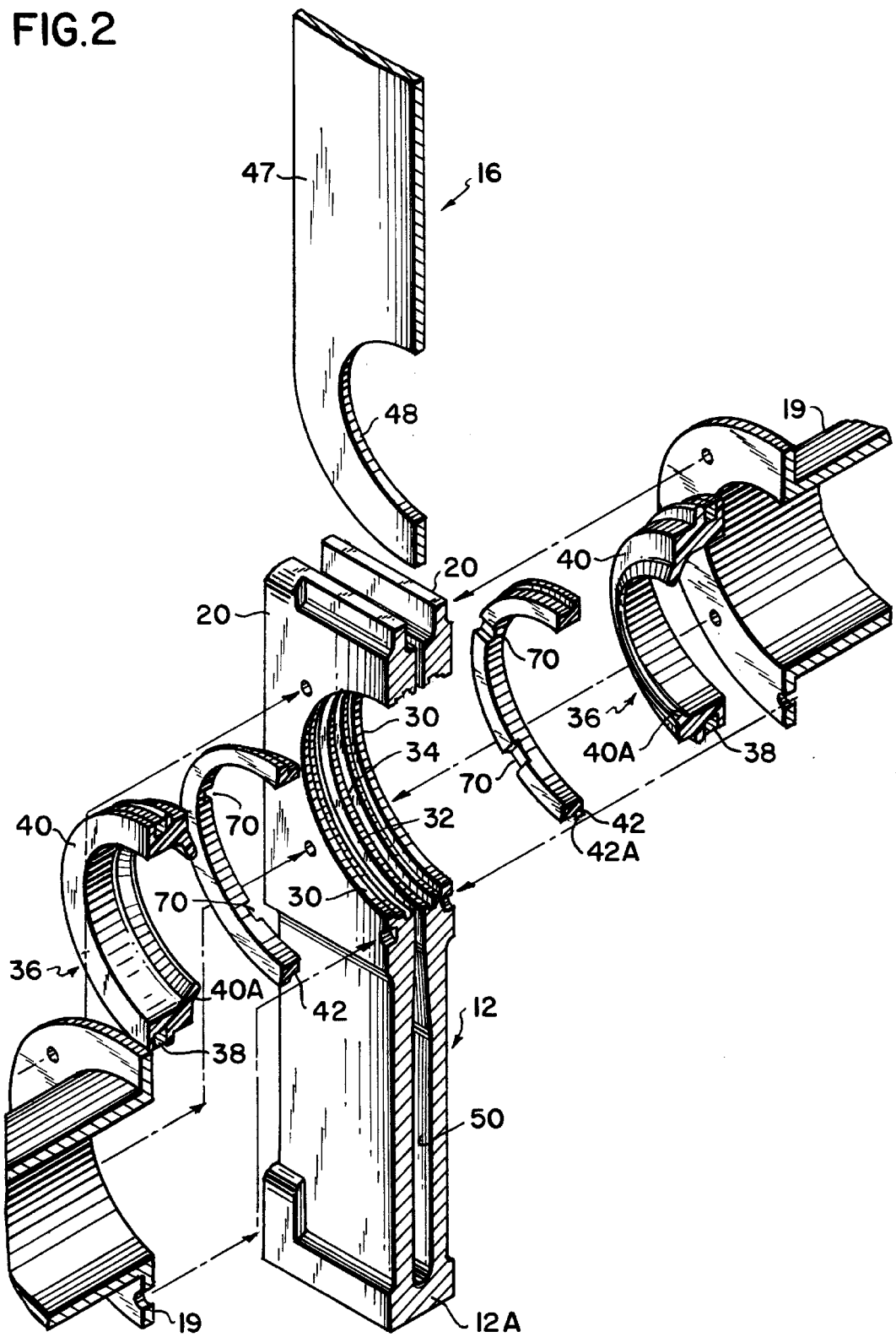

GATE VALVE SEAT

BACKGROUND OF THE INVENTION

The present invention relates to a gate valve and, more particularly, to gate valves formed to have a housing with axially aligned apertures for fluid flow between walls of such housing, and with sealing rings or sleeves coupled to the housing walls so as to create an annular space therebetween. A gate plate having an apertured section and an imperforate section is positioned for sliding contact with the sealing rings so as to open and close the valve when moved up and down within the annular space.

In the field of gate valve control of fluid flow, it has become conventional to insert a gate valve along or between lengths of pipe so that flow may be selectively interrupted in one or both directions by means of the operators control of an actuator on the gate valve.

In order to furnish the man skilled in the art with an appreciation of the present invention, reference may be made to the disclosures of a variety of gate valves which, generally speaking, have a similar gate plate to that already noted above. Some of these valves are known as "knife valves" where, in fact, a knife edge is created on the leading edge of the gate plate. See, for example, Clarkson, U.S. Pat. No. 4,257,447.

Additionally, reference may be made to the following U.S. patents:

U.S. Pat. No. 4,765,361
U.S. Pat. No. 4,962,785
U.S. Pat. No. 3,945,604
U.S. Pat. No. 4,257,447
U.S. Pat. No. 5,370,149
U.S. Pat. No. 5,020,776
U.S. Pat. No. 5,082,247
U.S. Pat. No. 5,137,261
U.S. Pat. No. 5,464,035

Although the gate valves described or disclosed in the above cited references may have useful applications, their drawbacks dictate that a substantial improvement be achieved. For example, the seats of the valves, that is, of the sealing devices require a higher initial compression to effect the required seal on the gate plate, and the compression is continuous. It will be understood that ported valves with closed bodies have inherent pressure intensification in the bodies, and this pressure build-up is caused by continued movement of the gate plate into the sealed body after a seal has been effected between the gate plate and the seats. Moreover, the fluid or media in the body is being displaced by the gate plate, thereby creating a large pressure build-up. Also, it will be appreciated that in such a situation the packing for the valve is not adequate to withstand this pressure, and consequently, there are leaks of the fluid to atmosphere. In the case of ported valves with open bodies, these function to expel the process fluid, which is often corrosive and also expensive, to atmosphere during the stroke cycle.

Accordingly, it is a fundamental object of the present invention to overcome the afore-said problems and difficulties presented in prior art devices. The basic intent and therefore, ultimate function of the present invention is to effect a pressure seal in one direction on the valve gate, specifically on the valve seat within the gate, but to allow that seat to vent in the opposite direction when appropriate.

Although the valve seal of the present invention is pressure-energized in the operation of the gate valve, there is very little initial compression required to effect the seal because the seal is pressure assisted. This allows internal body pressure that would normally build up to vent to the low pressure. Moreover, the elastomer of which the sealing ring is constructed is only stressed minimally while the seal is being effected. A separate part carries the load of the pressure on the gate.

A number of advantages accrue to the design in accordance with the present invention. For example, the elastomer of which the seal or sealing ring is composed is stressed at lower levels due to the lower initial compression applied. The higher the pressure the better the seal but, notably, the elastomer is only stressed by the pressure while the seal is in effect. This is because the seal is pressure activated and the sealing ring does not guide the gate plate. The seal design allows the body cavity pressures to be relieved to the lower pipeline pressure. Moreover, packing life is extended because the packing does not have to guide the gate plate or contain high internal body pressures.

SUMMARY OF THE INVENTION

The present invention is defined by the annexed claims with reference to the specific embodiments thereof. In order to make clear the nature of the invention a broad feature thereof is defined as follows: a gate valve including at least one sealing means in the form of a sealing ring having a valve seat; a gate plate in sealing contact with said valve seat; and means for effecting a pressure seal in one direction on the seat but allowing the seat to vent in the opposite direction to relieve internal pressure.

A more specific feature resides in the provision of a gate valve in which said means includes having the sealing ring formed of an elastomer and having a toe-shaped valve seat in sealing contact with said gate plate and formed so as to define a cavity immediately adjacent and below the valve seat.

More specific features reside in having a closed valve body or housing including an enclosable reservoir cavity formed below the valve port or passageway constituted by central apertures in the walls of the valve housing; and in having a ring guide that functions separately from the sealing ring, to guide the gate plate in its travel.

Other and further objects, advantages and features of the present invention will be understood by reference to the following specification in conjunction with the annexed drawings, wherein like parts have been given like numbers.

BRIEF DESCRIPTION OF THE DRAWING

FIG. 2 is an exploded half perspective view of the gate valve of FIG. 1.

DETAILED DESCRIPTION OF THE INVENTION

Figure 1:
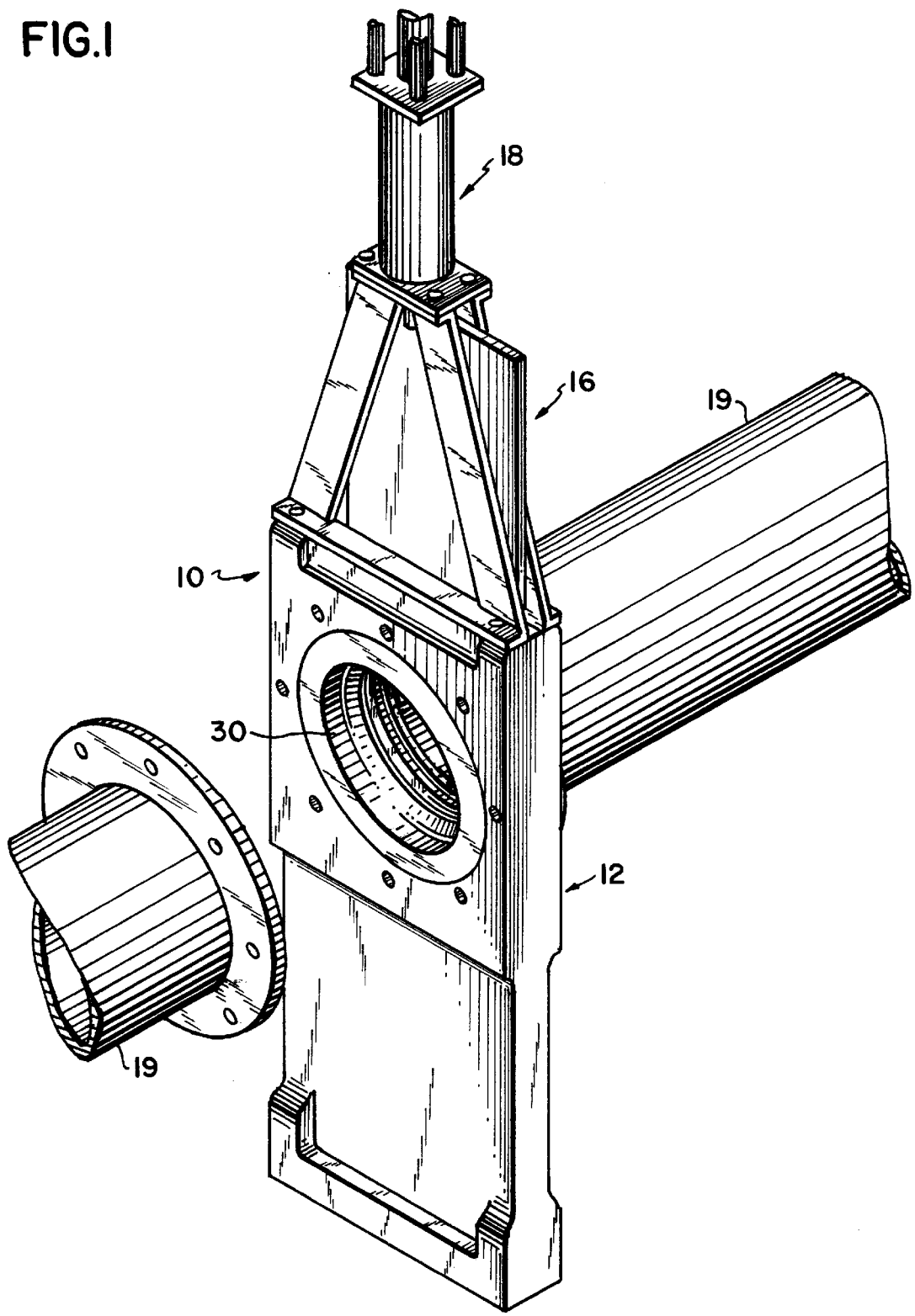
FIG. 1 is a perspective view of the gate valve constructed in accordance with the primary embodiment of the invention.

Referring now to the Figures of the drawing and particularly to FIG. 1, the primary embodiment of the present invention is shown in the form of a gate valve assembly 10, which includes a fixedly positioned housing 12 forming a valve body. A gate plate 16 is slideable within the housing, and an actuator 18 is secured to the housing and operatively coupled to the gate plate. These principal components 12, 16 and 18 constitute the gate valve assembly which is designed to be placed between adjacent flanged pipes 19 or the like for allowing the flow of fluids or preventing the flow thereof. Such pipes are coupled to the housing in conventional manner.

Figure 2A:
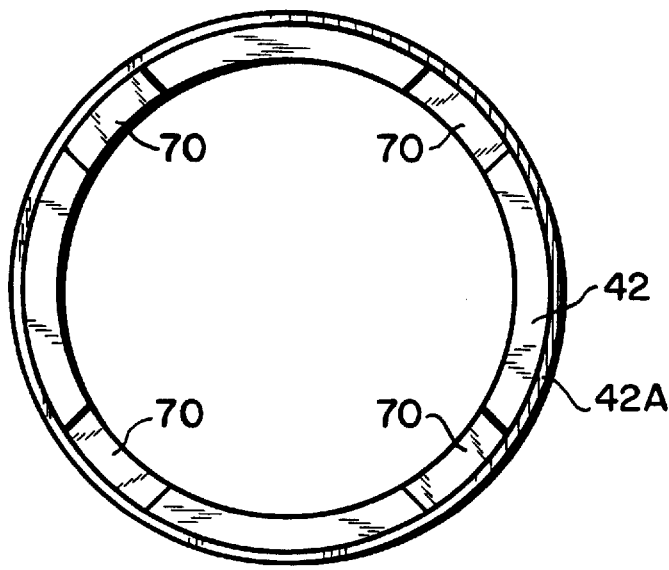
FIGS. 2a, 2b and 2c are views of the gate plate guide rings particularly showing the grooves therein.
Figure 2B:
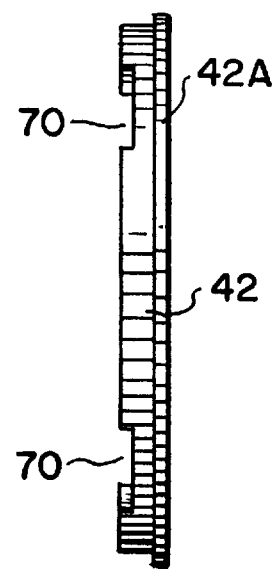
Figure 2C:
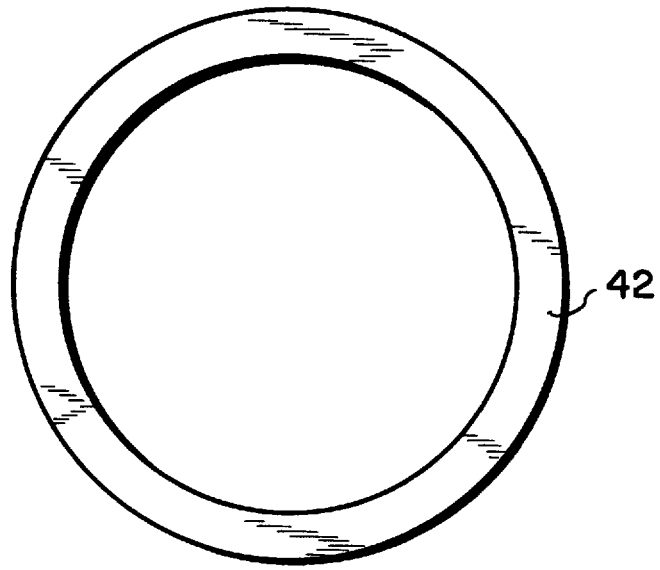
Figure 3:
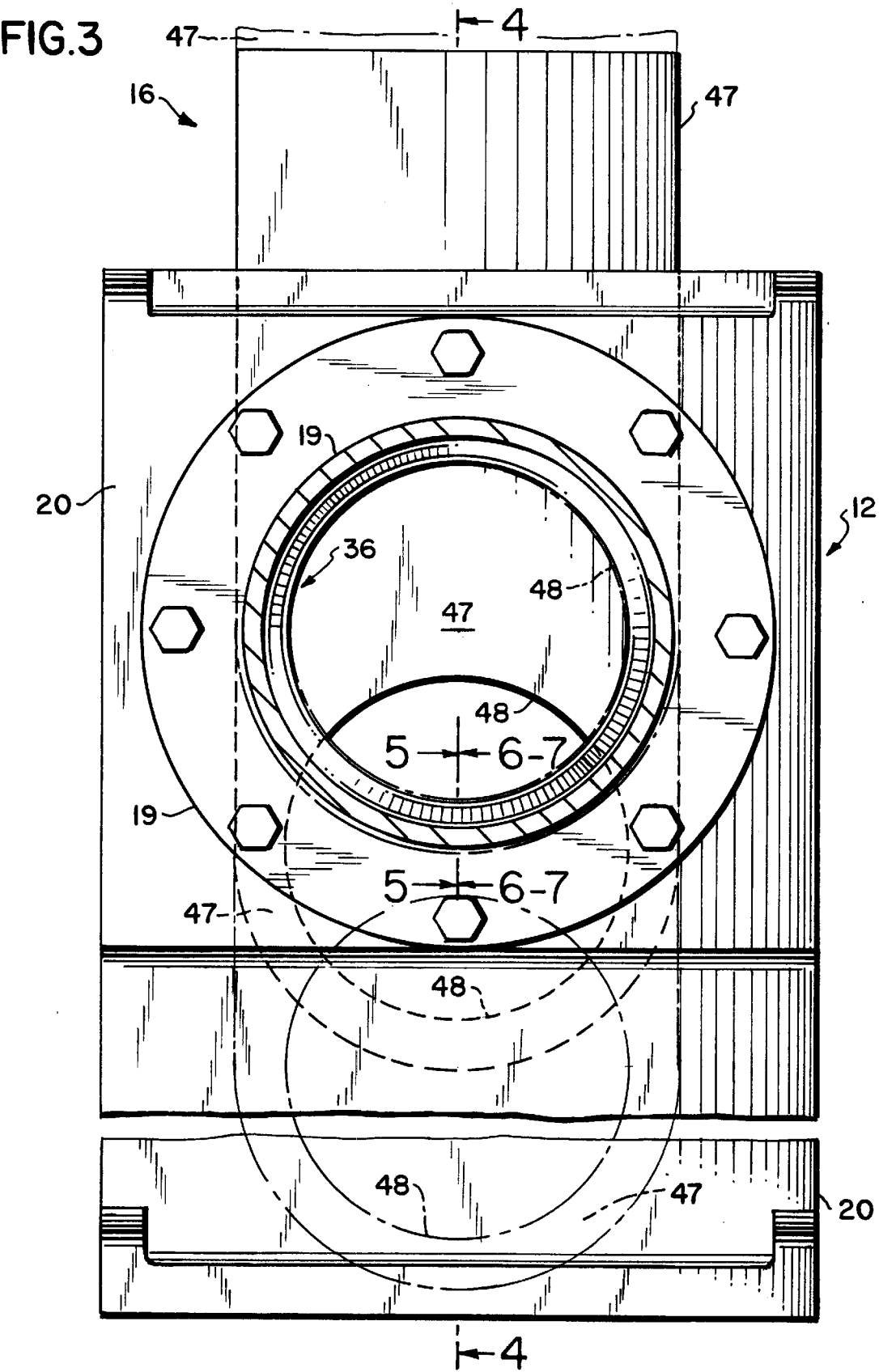
FIG. 3 is a truncated elevational view taken from one side of the gate valve.

Referring to FIG. 2, the housing 12 is formed as a unitary casting, having spaced parallel walls 20 of similar design and each wall is provided with a central aperture 30. The walls apertures confront each other so as partly to define a port or passageway 32 which is also defined by a predetermined gap 34 between the walls. It will be appreciated that the housing 12 is formed in a well-known manner whereby radially exterior threaded holes are provided in a circular pattern such that corresponding holes or apertures in the flanges of pipes 19 to be coupled can be engaged. By being formed as a unitary casting the proper spacing is insured for the walls in parallel relationship to provide the space or gap 34.

In the preferred embodiment pair of similarly shaped, oppositely located and directed, sealing rings or sleeves 36 fit into the housing 12 and provide the required seal for the gate valve. It will be understood, however, that only one sealing ring could be placed on one side of the valve. Sealing rings 36 are formed of a first part that is a washer-like radial support or stiffener 38—which may be of metal, plastic or hard rubber—to prevent the elastomeric ring from collapsing due to pressure or friction; and a second part which is an elastomeric ring 40. Each elastomeric ring 40 includes an axially extending interior seal seat 40A in the form of a "toe", the ring 40 having an outside diameter of a size to be received in, and effectively to line, and provide a radial seal on, the aperture 30 of a housing wall 20.

The sealing rings 36 not only line the respective aperture 30 but also serve to slightly reduce the width defined by the cylindrical gap 34 between the walls 20, the width being chosen to be slightly less than the width of the solid section 47 of gate plate 16, to effectuate a pressure seal in one direction on the seat but to allow the seat to vent in the opposite direction. Thus, it will be seen that the elastomeric ring 40 is configured (cross-section) in a boot-like shape with the "toe" of the boot being the portion 40A, as particularly seen in FIG. 5. With this particularly chosen configuration, an annular cavity 60 is realized between the gate plate 16 and the radially interior shaped portion of the ring 40 beneath toe 40A.

It will be noted that the numeral 20 designates the walls, i.e., the solid part of valve housing or body 12, whereas, 42 designates a guide ring, which is made of low friction load bearing material. It should be especially noted that the rings 42 are of slightly larger diameter than the sealing rings 40. These rings 42 serve as guides (see FIG. 5) for gate plate 16 when it is being moved. Moreover, they have the important function of enabling fluid to be forced into the cavity 60 defined by the sealing rings 40, as will be explained fully. The downward extension portion 42A (FIG. 5) of the guide rings is received in a slot in the valve body walls 20. The guide rings 42 are split to permit insertion into the valve body and the extensions 42A make sure that these guide rings stay in place.

Figure 5:
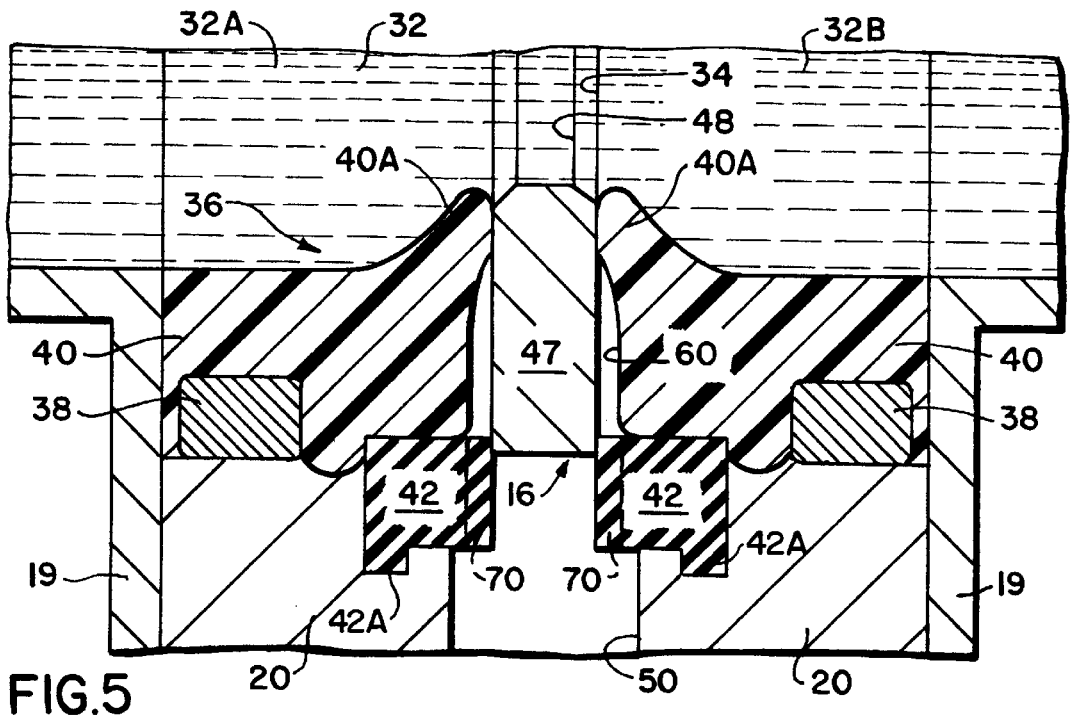
FIG. 5 is a fragmentary sectional view taken along line 5—5 in FIG. 3, with the gate plate in the open position.

The gate plate 16 is similar to those already known, that is, to say it has a solid section 47 and suitable aperture 48 therein of such construction that will align and be substantially congruent with the central apertures 30 in the respective housing walls 20, whereby an open condition for the gate valve can be achieved. Thus, as seen in FIGS. 1 and 5, a thru port 32 is established when the aperture 48 is so aligned. Additionally, when the plate is lowered sufficiently, the solid section 47 closes off fluid flow in the valve.

It will be seen that the lower end of housing 12 is closed by housing portion 12A and that the top of the housing has a packing 80 (FIG. 4) around the gate plate to provide a seal. Accordingly, the present invention functions in a closed or sealed system.

It will be understood that the over-arching objective of the present invention, namely, to effect a pressure seal in one direction on the valve seat 40A, but to allow the seat to vent in the opposite direction is achieved by the construction already described. Notably, the sealing rings 40 are so constructed that the seats efficiently perform the sealing function, but the rings 40 are dispensed from having to guide the gate plate, this function being provided by the guide rings 42.

OPERATION OF GATE VALVE

Referring now, in particular, to FIGS. 4, 5, 6 and 7, the various stages or conditions of the gate valve plate 16 in opening and closing the valve will be appreciated.

Figure 7:
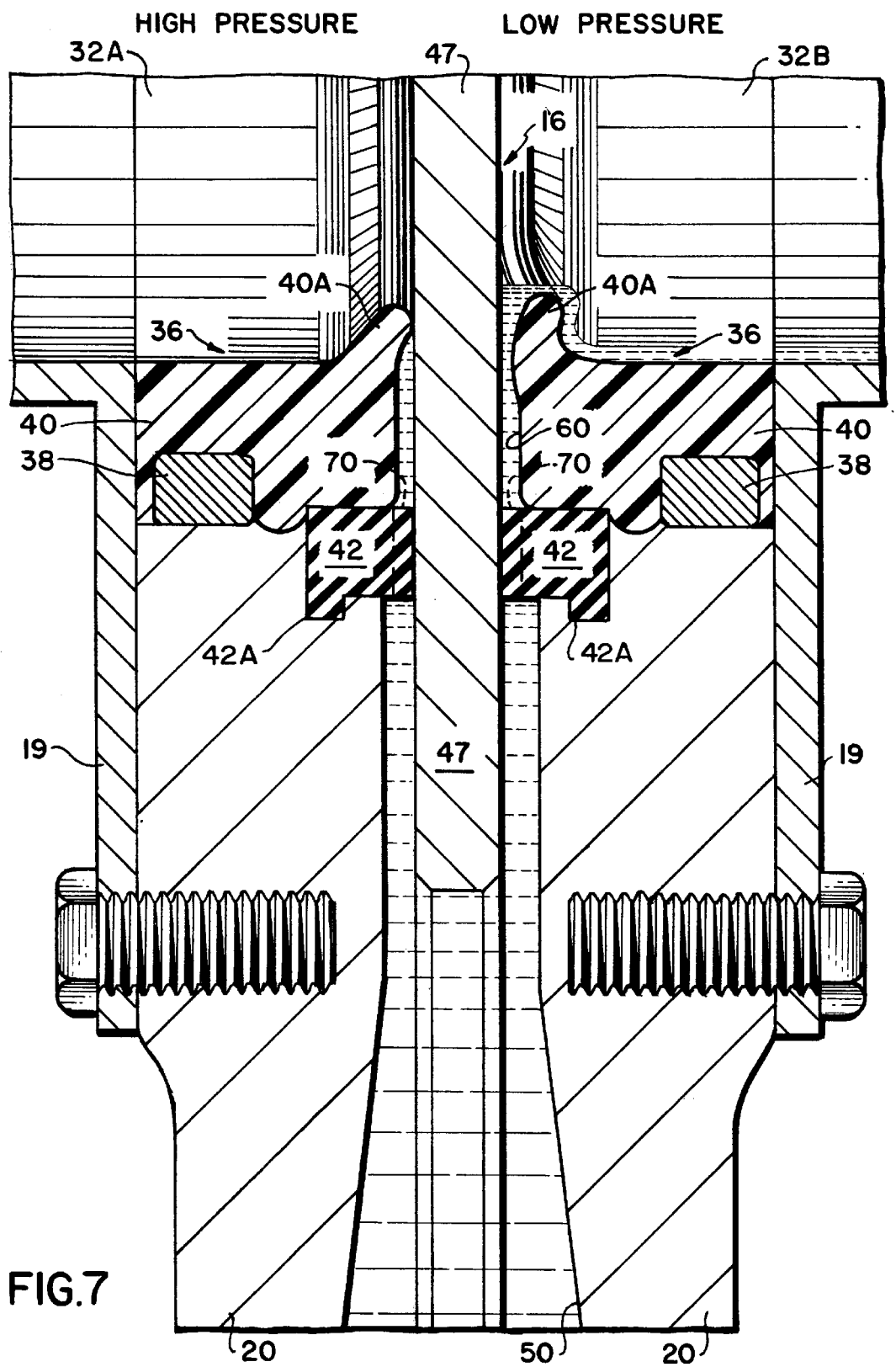
FIG. 7 is a fragmentary sectional view taken along the line 7—7 in FIG. 3, showing the gate valve in the closed position.

Closing of the valve will first be considered by reference to FIG. 7, wherein it will be seen that the solid section 47 of the gate plate 16 has moved into the bottom portion cavity 50 of the gap 34 or space between the housing walls 20. It will be understood that the aperture 48 within the plate 16 has already preceded, but is not fully seen in the fragmentary view of FIG. 7. Lowering of the gate plate 16 into the reservoir formed in the bottom portion cavity 50 causes displacement of the fluid therein, which is forced upwardly thru grooves 70 (grooves spaced around guide ring 42, see FIGS. 2a, 2b, 2c), and into the cavity 60, to the right as already noted; thence upwardly into the lower pressure portions 32A or 32B of port 32, depending upon fluid flow direction. In FIG. 7, the high pressure portion 32A is shown on the left. Once the lowering of the gate plate 16 stops, there is no more displacement of fluid and hence no more exodus of fluid into cavity 60.

It will be understood that in the described condition of gate plate 16, fluid forced into the cavity 60 causes an increase in pressure, and when this pressure slightly exceeds the lower of the pressures in a portion 32A and 32B of port 32, the fluid will vent at the toe portion 40A of the seal 40 (on the left) or seal 40 (on the right, FIG. 7) back into the lower pressure portion of port 32 until the pressure is equalized or slightly higher. This pressure difference is dependent on the stiffness of the elastomer of which the rings 40 are composed, and on their interference with gate plate 16. Gate 16 is limited in side to side motion by the guide rings 42 from moving far enough away from the rings 40 to break the seal. As already noted, guide rings 42 absorb the load from gate 16 caused by the pressure differential between the two portions of port 32.

The condition of the valve being completely open can best be appreciated by reference to FIG. 5. As gate plate 16 moves toward the open position, (FIG. 4), the seals provided by sealing rings 40, and more specifically by toe portion or seat 40A thereof, are broken and flow is allowed between 32A and 32B. When the gate plate 16 reaches the end of its travel in providing the open position, its aperture 48 will be concentric or congruent with the apertures of walls 20 and sealing rings 40. It will be appreciated that seals are now effected between rings 40 and the perimeter of the aperture 48 in gate plate 16 as long as a pressure differential exists between 32A and 60, and between 32B and 60, with the higher pressure in 32A and 32B. (The unwanted leakage is that between 32A and 32B when the gate plate is CLOSED by means of fluid introduced in 32A, for example, if it is the high pressure side, going past seat 40A out into 60 sneaking around the gate plate back into 60 on the other side and up past the other seat 40A and out 32B. When the gate is all the way OPEN there is no leakage from cavity 60 to worry about.).

Figure 4:
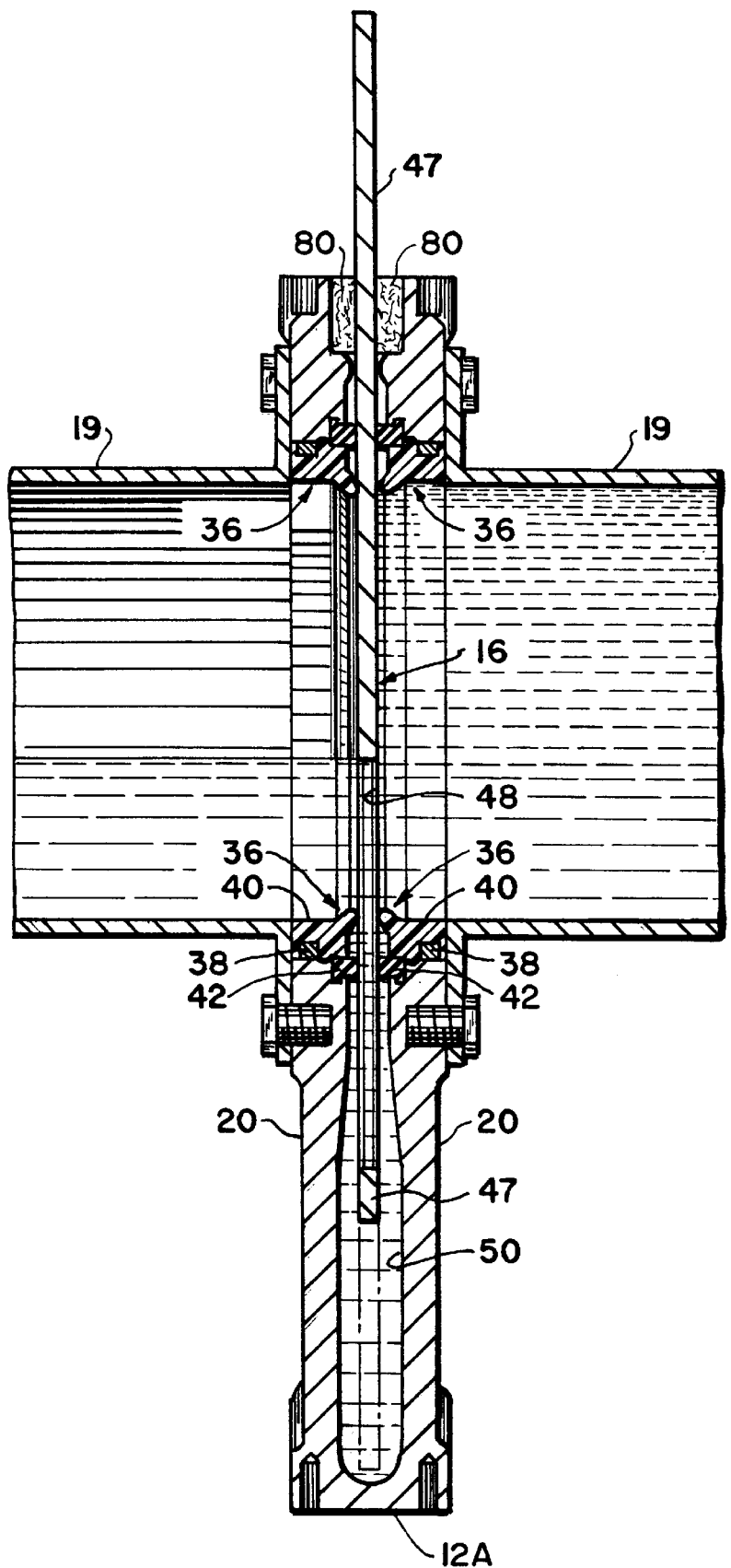
FIG. 4 is a sectional view taken on the line 4—4 in FIG. 3, showing the gate plate moved downward so as to partly block the fluid flow.
Figure 6:
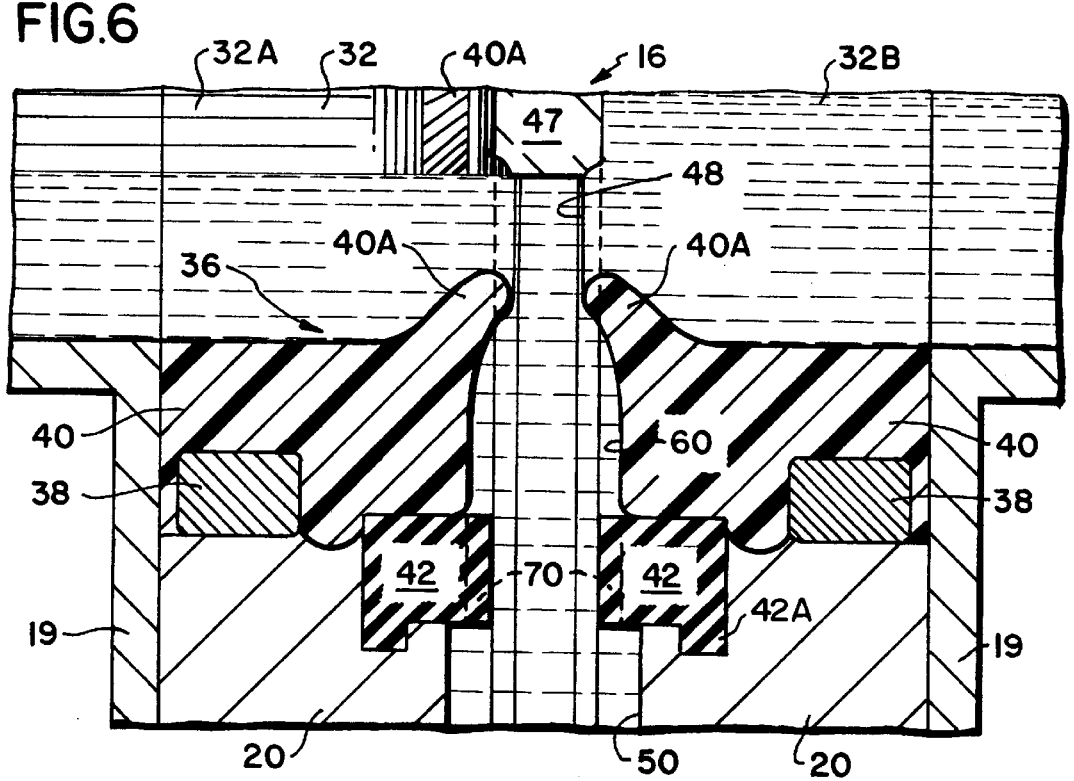
FIG. 6 is a fragmentary sectional view taken along line 6—6 in FIG. 3, with the gate plate approaching the closed position.

FIG. 6 depicts what happens when the gate plate 16 has been moved almost to the closed position; it particularly illustrates the inward movement of portions 40A of the flexible sealing rings 40 with respect to aperture 48 in plate 16. FIG. 4 provides a vertical sectional view of substantially the entire gate valve assembly in the partly open position for gate plate 16.

The gate valve of the present invention has been described in the context of an embodiment in which a pair of sealing devices are disposed on respective sides of the gate plate. However, the principle of the invention can also be embodied in a gate valve scheme involving only one sealing device; in which case displacement of fluid from the reservoir cavity 50 as described still takes place, except that the fluid vents directly into the low pressure portion of thru port 32, rather than being vented past another sealing ring whose seat has been appropriately moved away from for the purpose (as described in the two sealing ring embodiment.)

What has been disclosed herein is a unique gate valve assembly which features a gate valve having at least one sealing ring defining a valve seat which insures the function of efficient sealing of the seat against the gate plate. However, the sealing operation thus performed is totally separated from the gate plate guiding function which is performed by a separate guide ring. What this results in is an arrangement for effecting a pressure seal in one direction on the seat but allowing the seat to vent in the opposite direction when appropriate to relieve internal pressure. This results in minimizing wear on the valve seat.

The invention having been thus described with particular reference to the preferred forms thereof, it will be obvious that various changes and modifications may be made therein without departing from the spirit and scope of the invention as defined in the appended claims.

In the claims:

1. A gate valve comprising:

a valve housing having high pressure and low pressure sides, and having first and second housing walls secured together in face to face relationship with an aperture extending through each housing wall in alignment about a central axis so as to define a chamber, including a gap, therebetween; said first housing wall being on the high pressure side of the valve housing, and said second housing wall being on the low pressure side;

a sealing ring formed of an elastomeric material and having a valve seat extendable into the gap a predetermined distance, the sealing ring extending axially and lining the aperture of the first housing wall;

a gate plate, having opposite sides, disposed within the chamber and formed with an imperforate section and an apertured section in sliding contact with said valve seat and reciprocable between an open position wherein the apertured section is located between the wall apertures to provide a port for fluid flow, and a closed position wherein the imperforate section is located between the wall aperture to prevent fluid flow through the port; said port having a high pressure portion and a low pressure portion corresponding with the respective sides of the valve housing;

a guide ring of load bearing material on each side of the gate plate for absorbing the compressive load resulting from the difference in pressure between the opposite sides of the gate, said guide rings extending axially and lining the respective wall apertures, said guide rings having an inner periphery larger than the inner periphery of said sealing ring, and projecting axially oppositely within the chamber to compressively engage said gate plate;

means for effecting sealing by the sealing ring wherein pressure in the high pressure portion of the port acts to force said valve seat against the imperforate section of the gate plate;

a first annular cavity defined between (a) an inner portion of said sealing ring which is positioned radially outwardly of the valve seat and (b) the imperforate section of said gate plate;

a second cavity extending below said guide rings; and means for venting the fluid pressure existing in said first cavity to the low pressure portion of the port including grooves formed in said guide rings for establishing fluid communication between said first cavity and said second cavity.

2. A gate valve comprising:

a valve housing having high pressure and low pressure sides, and having first and second housing walls secured together in face to face relationship with an aperture extending through each housing wall in alignment about a central axis so as to define a chamber, including a gap, therebetween; said first housing wall being on the high pressure side of the valve housing, and said second housing wall being on the low pressure side;

a sealing ring formed of an elastomeric material and having a valve seat extendable into the gap a predetermined distance, the sealing ring extending axially and lining the aperture of the first housing wall;

a gate plate, having opposite sides, disposed within the chamber and formed with an imperforate section and an apertured section in sliding contact with said valve seat and reciprocable between an open position wherein the apertured section is located between the wall apertures to provide a port for fluid flow, and a closed position wherein the imperforate section is located between the wall aperture to prevent fluid flow through the port; said port having a high pressure portion and a low pressure portion corresponding with the respective sides of the valve housing;

a guide ring of load bearing material on each side of the gate plate for absorbing the compressive load resulting from the difference in pressure between the opposite sides of the gate, said guide rings extending axially and lining the respective wall apertures, said guide rings having an inner periphery greater than the inner periphery of said sealing ring, said guide rings projecting axially oppositely within the chamber to compressively engage said gate plate;

first cavity defined between an inner portion of said sealing ring which is radially outwardly of the valve seat and the imperforate section of said gate plate;

a second cavity extending below said guide rings; and means for venting the fluid pressure existing in said first cavity to the low pressure portion of the port including means for establishing fluid communication between said first cavity and said second cavity.

3. A gate valve as defined in claim 2, in which said means for venting includes grooves formed in said guide rings for establishing fluid communication between said first cavity and said second cavity.

4. A gate valve as defined in claim 2, in which said valve seat is formed to project radially and axially into the gap between the wall apertures, and wherein the fluid pressure in the high pressure portion of the port against said valve seat effects sealing.

5. A gate valve as defined in claim 2, further comprising another sealing ring formed of elastomeric material and having a valve seat extendable into the gap a predetermined distance, said another sealing ring extending axially and lining the aperture of the second housing wall.

6. A gate valve as defined in claim 3, further comprising a third, reservoir cavity formed in a lower part of the housing, said reservoir cavity being enclosed; and means, responsive to the reciprocable gate plate being moved downwardly into said reservoir cavity for displacing fluid therein such that the fluid moves into the low pressure portion of said port to relieve the internal pressure within the valve housing.

7. A gate valve comprising:

a valve housing having high pressure and low pressure sides, and having first and second housing walls secured together in face to face relationship with an aperture extending through each housing wall in alignment about a central axis so as to define a chamber, including a gap, therebetween; said first housing wall being on the high pressure side of the valve housing, and said second housing wall being on the low pressure side;

a sealing ring formed of an elastomeric material and having a valve seat extendable into the gap a predetermined distance, the sealing ring extending axially and lining the aperture of the first housing wall;

a gate plate, having opposite sides, disposed within the chamber and formed with an imperforate section and an apertured section in sliding contact with said valve seat and reciprocable between an open position wherein the apertured section is located between the wall apertures to provide a port for fluid flow, and a closed position wherein the imperforate section is located between the wall aperture to prevent fluid flow through the port; said port having a high pressure portion and a low pressure portion corresponding with the respective sides of the valve housing;

a guide ring of load bearing material on each side of the gate plate for absorbing the compressive load resulting from the difference in pressure between the opposite sides of the gate, said guide rings extending axially and lining the respective wall apertures, said guide rings having an inner periphery larger than the inner periphery of said sealing ring, and projecting axially oppositely within the chamber to compressively engage said gate plate;

means for effecting sealing by the sealing ring wherein pressure in the high pressure portion of the port acts to force said valve seat against the imperforate section of the gate plate;

a first annular cavity defined between (a) an inner portion of said sealing ring which is positioned radially outwardly of the valve seat and (b) the imperforate section of said gate plate;

a second cavity extending below said guide rings; and means for venting the fluid pressure existing in said first cavity to the low pressure portion of the port including means for establishing fluid communication between said first cavity and said second cavity.

* * * * *